INVENTORS
RAYMOND H. CAMP
ALBERT S. PRATT

ATTORNEY

INVENTORS
RAYMOND H. CAMP
ALBERT S. PRATT

ATTORNEY

United States Patent Office 3,301,975
Patented Jan. 31, 1967

3,301,975
SENSING DEVICE FOR DETECTING A SHEET ON A TRANSPORT OR DRUM
Raymond H. Camp, Cinderford, and Albert S. Pratt, Churchdown, England, assignors to Xerox Corporation, Rochester, N.Y., a corporation of New York
Filed Oct. 7, 1965, Ser. No. 493,726
Claims priority, application Great Britain, July 25, 1965, 32,531/65
2 Claims. (Cl. 200—61.41)

This invention relates to a sheet sensing device for detecting sheets on an electrostatic transport or drum.

More particularly, this invention relates to a device for detecting the presence of a sheet of paper in the path of movment thereof wherein the sheet may be conveyed by an electrostatic transport such as a rotating drum in a xerographic apparatus.

In a xerographic apparatus, a rotating drum having a photoconductive surface is used to create an electrostatic latent image on its surface. A powder image in the configuration of the electrostatic image is developed on the drum surface and transferred to cut sheets of paper by means of electrostatic charge applied to the back of the paper. Since there is a latent electrostatic charge on the surface of the drum and an electrostatic charge is applied on the paper during the transfer operation, the paper tends to adhere to the surface of the xerographic drum. The sheets of paper are stripped from the surface of the drum after transfer, usually by a puffer which blows a sharp stream of air between the paper and the drum and physically forces the sheet of paper away from the drum surface. Occasionally, a sheet of paper will adhere to the drum surface past the position at which it should be removed. This occurs when, for any reason, the puffer mechanism fails to operate or the paper is not aligned in the proper position on the drum to be removed from the drum. When this situation occurs, it is desirable to detect or sense the sheet of paper on the drum surface and immediately shut down the machine before subsequent copies are reproduced or the paper is jammed within the machine.

Heretofore, it has not been possible to use a device of the type herein disclosed. Previously, various photocells were used to detect the presence or absence of a sheet of paper on the electrostatic transport or xerographic drum. These devices although satisfactory under certain conditions had a tendency due to the presence of toner material in and around the drum to accumulate toner material on the surface thereof thereby rendering the photocell ineffective.

The present invention comprises an extremely light weight sensing arm which rides on the electrostatic transport or xerographic plate without damage thereto. It had previously been thought that an object of the type herein disclosed could not possibly be used due to the possible damage to the electrostatic transport or xerographic plate. The present construction allows the sensing arm to ride on the electrostatic transport or xerographic drum without damage thereto.

Thus, when a sheet fails to be stripped from the xerographic plate, the sensing device which is the subject of this invention detects the presence of the sheet actuating the switch which automatically serves to shut down the machine. This will enable the operator of the machine to remove the sheet from the machine before any damage is done to the machine or the drum. The machine is then started again to run in the normal manner.

It is, therefore, an object of this invention to control a machine by means of an automatic device which senses the presence of a misfed sheet.

It is a further object of this invention to detect misfed sheets of paper in a xerographic apparatus.

It is another object of this invention to detect sheets of paper which adhere to a rotating xerographic drum to control a xerographic machine by a device that is not subject to failure due to the accumulation of dirt and one that will not damage the xerographic drum during the use thereof.

These and other objects of this invention are attained by means of a switch which is connected to a connecting arm which has mounted thereon a sensing arm which detects the presence of a misfed sheet of paper.

For a better understanding of the invention as well as other objects and further features thereof, reference is had to the following detailed description of the invention to be read in connection with the accompanying drawings, wherein.

Figure 1:
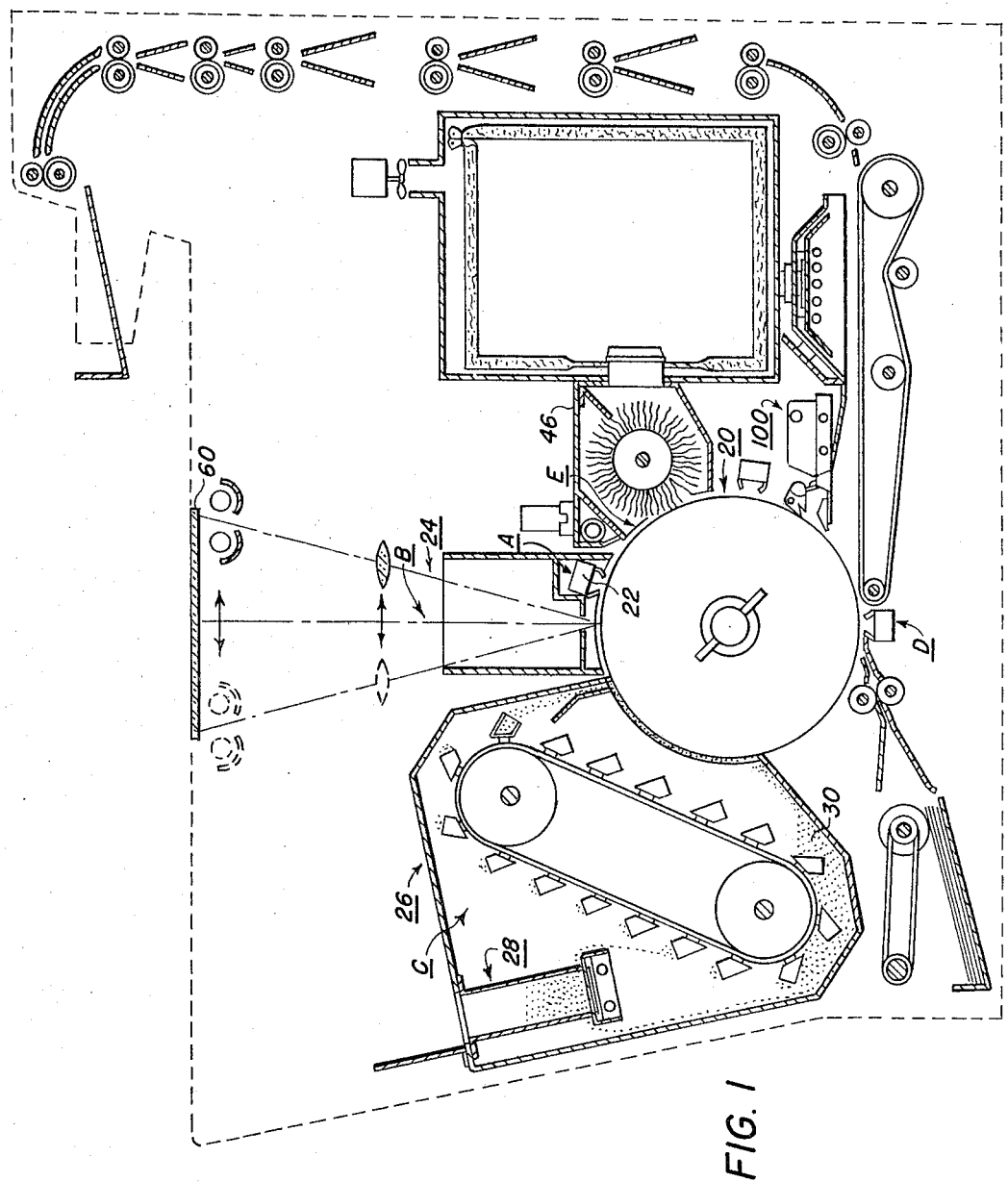
FIGURE 1 illustrates schematically a preferred embodiment of a xerographic apparatus adapted for continuous and automatic operation and incorporating a sensing device in accordance with the invention.
Figure 2:
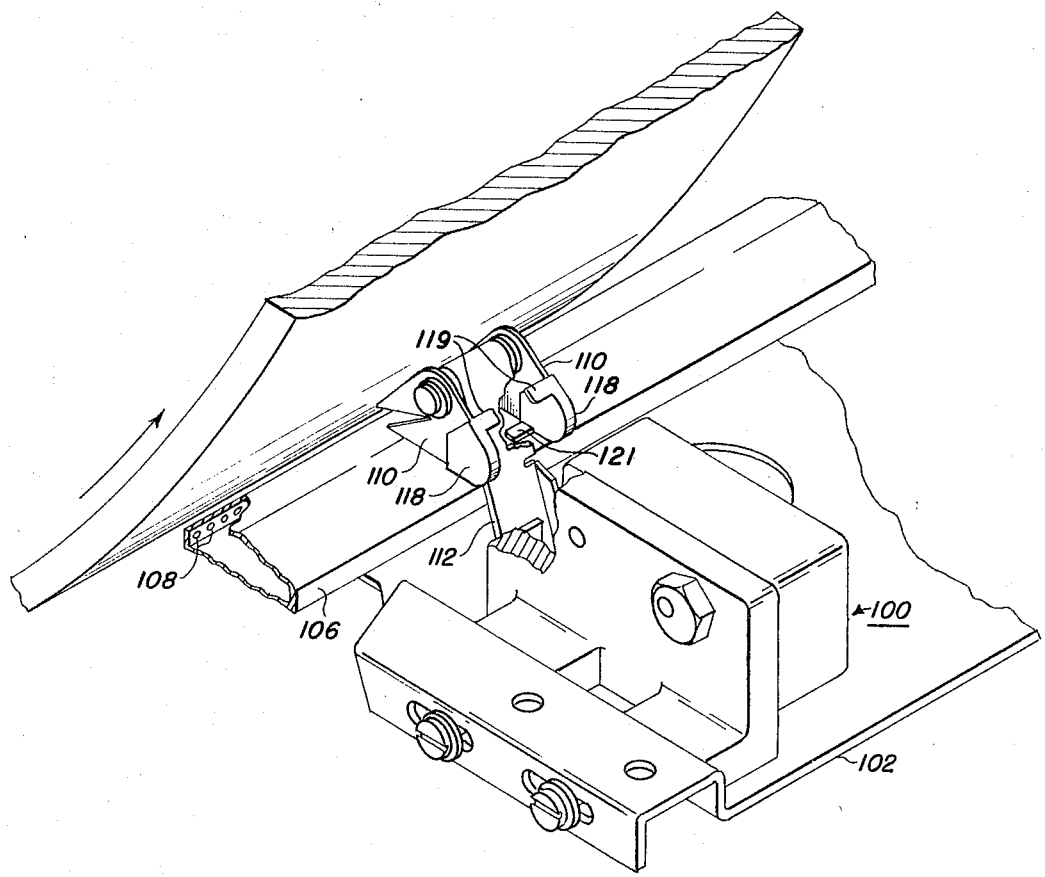
FIGURE 2 is an isometric view of the sensing device puffer and xerographic drum with parts broken away.

As shown in FIGURE 1, the xerographic apparatus comprises a xerographic plate including a photoconductive layer or light receiving surface on a conductive backing and formed in the drum 20 which is journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally as follows:

A charging station at which a uniform electrostatic charge is deposited;

An exposure station at which a light to be reproduced is projected onto the drum surface to dissipate the drum charge on the exposed areas thereof, and thereby form an electrostatic image on the copy to be reproduced as shown at B. A developing station where a xerographic drum is developed is shown at C. A transfer station at which the xerographic powder image is electrostatically transferred from the drum surface to the material is shown at D. A drum cleaning station is shown at E.

The charging apparatus or corona charging device 22 includes a corona discharge array of one or more discharge electrodes that extends transversely across the drum surface, are energized by high potential source and are substantially enclosed within a shielding member.

The optical scanning or projection assembly generally designated as 24, comprises a copyboard or platen 60 which may consist of a transparent plate member which is adapted to receive an original. The copyboard is uniformly illuminated and arranged in light projecting relation to the moving light receiving surface of the xerographic drum.

Adjacent to the exposure station is a developing station C in which there is positioned a developer apparatus 26 including a developer housing having a lower or sump portion for accumulating developer material 30. Mounted within the developer housing is a motor driven bucket-type conveyor used to carry the developer material previously supplied to the developer housing to the upper portion of the developer housing from where the developer material is cascaded over a hopper chute onto the drum.

As the developer material cascades over the drum, toner particles of the developer material adhere electrostatically to the previously formed electrostatic latent image areas on the drum to form a visible xerographic powder image; the remaining developer material falling off the peripheral surface of the drum into the bottom of the developer housing. Toner particles consumed during the developing operation to form the xerographic powder images are replenished by a toner dispenser 28 mounted within the developer housing.

Positioned next adjacent to the developing station is the image transfer station D which includes suitable sheet feeding mechanism adapted to feed sheets of paper successively to the xerographic drum in coordination with the presentation of the developed image on the drum at the transfer station.

The next and final station in the device is a drum cleaning station E whereat any powder remaining on the xerographic drum after the transfer step is removed and whereat the xerographic drum is flooded with light to cause dissipation of any residual electrical charge remaining on the xerographic drum.

Removal of residual powder from the xerographic drum is effected by means of a brush cleaning device 46 adapted to continuously clean the xerographic drum.

It is believed that the foregoing description is sufficient for the purposes of this application to show the general operation of the xerographic reproducing apparatus. For further details concerning the specific construction of the xerographic apparatus shown, reference is made to Patent No. 3,062,109 issued November 6, 1962, to Mayo et al.

The sensing device 100 is mounted adjacent the xerographic drum 20 on a base 102. A sheet of paper 104 is normally carried past the xerographic drum for transfer of the developed xerographic image from the drum to the sheet 104. In normal operation an air puffer 106, which comprises an air manifold, having openings 108 in a portion of the puffer adjacent the xerographic drum, will strip the sheet of paper from the drum. Thus, in normal operation, the sheet of paper will be stripped from the drum as shown in the full lines in FIG. 3.

If for any reason the sheet of paper 104 is not properly stripped or removed from the xerographic drum or electrostatic transport, it will continue to travel along the path of movement of the drum. It is thus desirable at this point to cease operation of the machine so that the misfed sheet of paper may be removed from the machine before any damage is done thereto.

Figure 3:
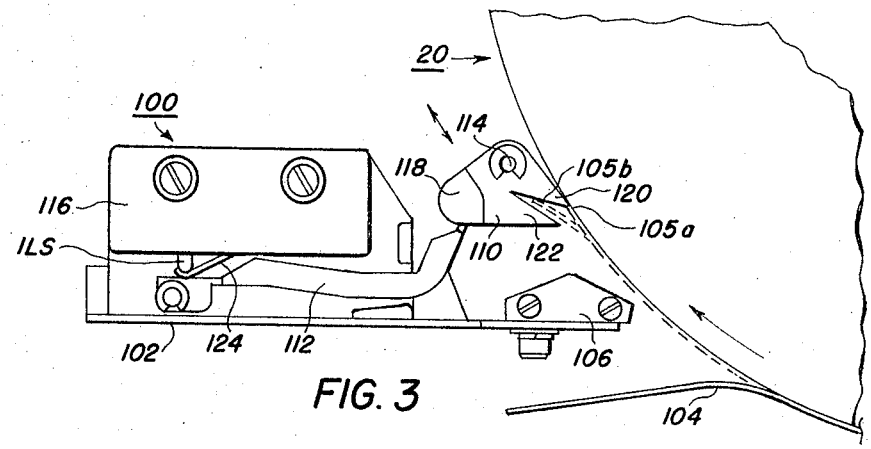
FIGURE 3 is a side view of the sensing device and the xerographic drum. A properly puffed sheet of paper is shown in solid lines and a mispuffed sheet of paper is shown in dotted lines.

A mispuffed sheet will take the path of movement shown in either of the dotted lines as shown in FIG. 3. Normally the sheet of paper will follow the path shown by the lines 105a, but it may be stripped from the drum and take the path indicated as 105b. A pair of extremely light weight sensing arms 110 continually ride with an extremely light pressure being applied thereto along the surface of the drum. The sensing arms are pivotally connected to a connecting arm 112 about a shaft 114. The connecting arm in turn is pivotally connected to a housing 116 which is mounted on the base. The sensing arms 110 are counter balanced by extremely light weights 118 which maintain the upper prong 120 of sensing arm 110 in contact with the drum. A pair of stops 119 and 121 limits the travel of each sensing arm 110 in either direction by contacting the connecting arm 112. As the mispuffed of misfed sheet of paper travels along its path of movement as shown in dotted lines in FIG. 3, it will be sensed by the prongs 120 of the sensing arm 110 (see dotted lines 105a) or the sheet may be stripped from the drum (see dotted lines 105b). In the latter case, the sheet of paper will be forced between the prongs 120 and 122 of the sensing arm 110. In either case, the sensing arm is pivoted in the direction of rotation of the xerographic drum. This will cause actuation of the connecting arm in the reverse direction thereby actuating the spring lever 124 mounted in the housing 116. This lever operates a switch 1LS which serves to shut down the machine as described below.

Figure 4:
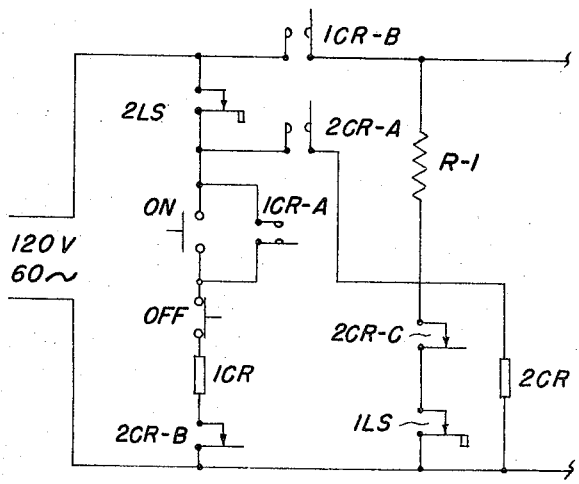
FIGURE 4 is a schematic wiring diagram showing the operation of the sensing device in a machine.

After the machine has properly warmed up, an actuator or "on" button can then be operated. A partial schematic electric wiring diagram of the machine appears in FIGURE 4, the operation of which is described below. Upon actuation of the "on" button relay 1CR is energized thereby closing contacts 1CRA and 1CRB. The purpose of closing the contacts 1CRA is to allow the "on" button to be released after it is actuated. In such a manner, the circuit remains energized even though the "on" button is released. The purpose of closing contacts 1CRB is to energize the machine and put it into operation. A resistor R–1 limits the current flow through the contacts 2CRC and the limit switch 1LS.

When a sheet of paper is mispuffed, the limit switch 1LS is opened in the sensing device 100. Thus, when the limited switch 1LS opens, relay 2CR will be energized. The contacts 2CRA will close. The contacts 2CRB and 2CRC will open. Thus, the relay 1CR will be de-energized, thereby opening contacts 1CRA and 1CRB. The opening of contacts 1CRB opens the circuit of the machine. Thus, the entire machine will be shut down except for the relay 2CR which remains energized through the circuit including contacts 2CRA and limit switch 2LS. Relay 2CR remains closed so that contacts 2CRB remain open. Thus, it can readily be seen that in this condition, upon operation of the "on" button relay 1CR cannot be energized and the machine cannot be turned on.

It is thus necessary to either unplug the machine which normally does not occur or perform some other operation in the machine to open limit switch 2LS. The opening of limit switch 2LS usually occurs when the mispuffed sheet is removed from the machine. This opening of limit switch 2LS can occur in any one of a number of ways, for example, in some machines it is necessary to move the developer housing back from the xerographic drum before the drum can be moved in order to remove the mispuffed sheet of paper. Under other conditions, a pair of feed rolls may have to be separated before the mispuffed sheet can be removed. In such a case, the separation of the feed rolls open the limit switch 2LS, the relay 2CR is de-energized, thus opening the contacts 2CRA and closing the contacts 2CRB and 2CRC. After the mispuffed sheet has been properly removed from the machine, it is thus necessary to return the machine to normal operating conditions by closing the switch 2LS, for example, by returning the drum and developer housing to its proper condition or by closing the feed rolls which serve to open and then close the limit switch 2LS.

It can readily be seen that this is an effective manner to insure that once the machine is shut down, due to a mispuffed sheet of paper, it cannot be reactivated merely by pushing the "on" button. After the mispuffed sheet of paper has been removed from the machine, the connecting arm 112 will return to its normal position as shown in FIG. 3 by the force of its own weight and the sensing arms 110 will be moved back in contact with the drum with the help of weights 118. Thus, it can be seen that the instant sensing device provides an effective means for preventing damage to the machine and the drum. It provides not only a means to detect mispuffed sheets of paper and thus shut down the machine but also prevents the machine from being reactivated before the mispuffed sheet of paper is removed from the machine.

What is claimed is:
1. In a machine including a drum, a sensing device for detecting a sheet that is being transported in a path of movement by the drum including:
    a base mounted adjacent the drum;
    a connecting arm pivotally connected to the base;
    a switch mounted on the base operable by the connecting arm;
    a sensing arm mounted on the connecting arm in sliding contact with the drum to sense the presence of the sheet; means pivotally mounting the sensing arm to the connecting arm;

means associated with the sensing arm to force the sensing arm into the path of movement of the sheet;

said sensing arm operable by the sheet to move the connecting arm which is operable to actuate said switch to shut down the machine.

2. In a xerographic machine including a xerographic drum, a sensing device for detecting a sheet that is being transported in a path of movement by the xerographic drum including:

a base mounted adjacent the xerographic drum;
a connecting arm pivotally connected to the base;
a switch mounted on the base operable by the connecting arm;
a sensing arm mounted on the connecting arm in sliding contact with the xerographic drum to sense the presence of the sheet; means pivotally mounting the sensing arm to the connecting arm;
a weight mounted on the sensing arm to force the sensing arm into contact with the xerographic drum;
said sensing arm having two prongs defining a notch to force the sheet between the prongs into the notch;
said sensing arm operable by the sheet to positively sense the presence thereof to move the connecting arm which is operable to actuate said switch to shut down the machine.

References Cited by the Examiner

UNITED STATES PATENTS

| | | | |
|---|---|---|---|
| 2,521,951 | 9/1950 | Schubert | 88—24 |
| 2,627,203 | 2/1953 | Hessert | 88—24 |
| 2,743,925 | 5/1956 | Elliott et al. | 200—61.41 |
| 3,215,793 | 11/1965 | Campbell et al. | 200—61.41 |

BERNARD A. GILHEANY, *Primary Examiner.*

J. BAKER, *Assistant Examiner.*